(12) United States Patent
Khinast et al.

(10) Patent No.: US 11,118,954 B2
(45) Date of Patent: Sep. 14, 2021

(54) SYSTEM AND A METHOD FOR CONSTANT MICRO-DOSING AND FEEDING OF POWDER MATERIAL

(71) Applicant: Research Center Pharmaceutical Engineering GmbH, Graz (AT)

(72) Inventors: Johannes Khinast, Graz (AT); Eyke Slama, Nestelbach bei Graz (AT); Sara Fathollahi, Graz (AT); Thomas Klein, Kindberg (AT); Maximilian Besenhard, Graz (AT)

(73) Assignee: Research Center Pharmaceutical Engineering GmbH, Graz (AT)

( * ) Notice: Subject to any disclaimer, the term of this patent is extended or adjusted under 35 U.S.C. 154(b) by 294 days.

(21) Appl. No.: 16/340,087

(22) PCT Filed: Oct. 6, 2017

(86) PCT No.: PCT/EP2017/075578
§ 371 (c)(1),
(2) Date: Apr. 5, 2019

(87) PCT Pub. No.: WO2018/065616
PCT Pub. Date: Apr. 12, 2018

(65) Prior Publication Data
US 2020/0158549 A1 May 21, 2020

(30) Foreign Application Priority Data
Oct. 7, 2016 (GB) .................................. 1617075.5

(51) Int. Cl.
*G01F 11/00* (2006.01)
*B01J 8/00* (2006.01)
(Continued)

(52) U.S. Cl.
CPC ............. *G01F 11/003* (2013.01); *B01J 4/007* (2013.01); *B01J 4/008* (2013.01); *B01J 4/02* (2013.01); *B01J 8/002* (2013.01); *G01F 11/029* (2013.01)

(58) Field of Classification Search
CPC ..... B01J 4/007; B01J 4/008; B01J 4/02; B01J 8/02; B01J 8/002; G01F 11/029; G01F 11/003
See application file for complete search history.

(56) References Cited

U.S. PATENT DOCUMENTS 4,754,525 A   7/1988 Kleintjens
4,787,535 A  11/1988 Angly
(Continued)

FOREIGN PATENT DOCUMENTS

AT       195 134 B       1/1958
DE     1 951 363 A1      4/1971
(Continued)

OTHER PUBLICATIONS

Hagai, Chika; Notice of Reasons for Refusal in Application No. 2019-517910 (English translation); pp. 1-3; Japan Patent Office, 3-4-3 Kasumigaseki, Chiyoda, Tokyo Tokyo, Japan 100-8915.
(Continued)

*Primary Examiner* — Lessanework Seifu
(74) *Attorney, Agent, or Firm* — Robert A. Blaha; Smith Tempel Blaha LLC

(57) ABSTRACT

A system and a method for a constant micro dosing of powder material include a control device, a cylinder with a first opening and a piston movably arranged inside the cylinder and controllable by the control device. The piston is movable in the direction to or away from the first opening along a piston stroke direction. The cylinder stores the powder material between the piston and the first opening.
(Continued)

The piston pushes the powder material through the first opening by moving along the piston stroke direction. Further the system and the method include a removing device for removing the powder material which is pushed out of the first opening of the cylinder. The control device controls the piston and the removing device in a synchronized manner such that a predetermined amount of powder material pushed through the first opening is removable by the removing device.

18 Claims, 4 Drawing Sheets

(51) Int. Cl.
*B01J 4/00* (2006.01)
*B01J 4/02* (2006.01)
*G01F 11/02* (2006.01)

(56) References Cited

U.S. PATENT DOCUMENTS

| | | | |
|---|---|---|---|
| 4,905,525 | A | 3/1990 | Kurfürst |
| 5,855,233 | A | 1/1999 | Bolelli |
| 2012/0048422 | A1 | 3/2012 | Dagsland |

FOREIGN PATENT DOCUMENTS

| | | | |
|---|---|---|---|
| DE | 1 970 384 2 | A1 | 10/1997 |
| DE | 10 246 659 | A1 | 4/2004 |
| DE | 10 309 519 | A1 | 9/2004 |
| DE | 2 020 130 085 23 | U1 | 10/2013 |
| EP | 0 431 639 | A1 | 6/1991 |
| FR | 2 641 862 | A1 | 7/1990 |
| GB | 205 064 | A | 6/1924 |
| GB | 2 156 783 | A | 10/1985 |
| JP | S5717701 | A | 1/1982 |
| JP | S61271024 | A | 12/1986 |
| JP | H01254501 | A | 10/1989 |
| JP | H07137702 | A | 5/1995 |

OTHER PUBLICATIONS

Régert, T. ; Communication Pursuant to Article 94(3) EPC in Application 17 783 818.2; pp. 1-6; Dec. 9, 2020; European Patent Office; Postbus 5818, 2280 HV Rijswijk, Netherlands.
M. O. Besenhard, S. Karkala, E. Faulhammer, S. Fathollahi, R. Ramachandran, and J. G. Khinast, "Continuous Feeding of Low-Dose APIs via Periodic Micro Dosing.," Int. J. Pharm., May 2016; pp. 123-134.
X. Chen, K. Seyfang, and H. Steckel, "Development of a micro dosing system for fine powder using a vibrating capillary. Part 1: the investigation of factors influencing on the dosing performance.," Int. J. Pharm., vol. 433, No. 1-2, pp. 34-41, Aug. 2012.
L. Qi, X. Zeng, J. Zhou, J. Luo, and Y. Chao, "Stable micro-feeding of fine powders using a capillary with ultrasonic vibration," Powder Technol., vol. 214, No. 2, pp. 237-242, Dec. 2011.
S. Matsusaka, K. Yamamoto, and H. Masuda, "Micro-feeding of a fine powder using a vibrating capillary tube," Adv. Powder Technol., vol. 7, No. 2, pp. 141-151, Jan. 1996.
X. Lu, S. Yang, and J. R. G. Evans, "Studies on ultrasonic microfeeding of fine powders," J. Phys. D. Appl. Phys., vol. 39, No. 11, pp. 2444-2453, Jun. 2006.
X. Lu, S. Yang, and J. R. G. Evans, "Ultrasound-assisted microfeeding of fine powders," Particuology, vol. 6, No. 1, pp. 2-8, Feb. 2008.
T. Horio, M. Yasuda, and S. Matsusaka, "Effect of particle shape on powder flowability of microcrystalline cellulose as determined using the vibration shear tube method.," Int. J. Pharm., vol. 473, No. 1-2, pp. 572-578, Oct. 2014.
G. T. Jasion, J. S. Shrimpton, Z. Li, and S. Yang, "On the bridging mechanism in vibration controlled dispensing of pharmaceutical powders from a micro hopper," Powder Technol., vol. 249, pp. 24-37, Nov. 2013.
A. J. Hickey and N. M. Concessio, "Flow Properties of Selected Pharmaceutical Powders from a Vibrating Spatula," Part. Part. Syst. Charact., vol. 11, No. 6, pp. 457-462, Dec. 1994.
M. Barati Dalenjan, E. Jamshidi, and H. Ale Ebrahim, "A screw-brush feeding system for uniform fine zinc oxide powder feeding and obtaining a homogeneous gas—particle flow," Adv. Powder Technol., vol. 26, No. 1, pp. 303-308, Jan. 2015.
P. Kumar, J. K. Santosa, E. Beck, and S. Das, "Directwrite deposition of fine powders through miniature hoppernozzles for multimaterial solid freeform fabrication," Rapid Prototyp. J., vol. 10, No. 1, pp. 14-23, Feb. 2004.
Todd M. Francis, Christopher J. Gump, Alan W. Weimer, "Spinning wheel powder feeding device—fundamentals and applications", ScienceDirect, 2006.

SYSTEM AND A METHOD FOR CONSTANT MICRO-DOSING AND FEEDING OF POWDER MATERIAL

CROSS-REFERENCE TO RELATED APPLICATIONS

This application is a National Phase patent application and claims priority to and the benefit of the filing dates of International Patent Application PCT/EP2017/075578, filed on Oct. 6, 2017 and UK Application GB1617075.5, filed on Oct. 7, 2016, the entire contents of both applications are incorporated herein by reference.

TECHNICAL FIELD

Embodiments of the present invention relate to the field of dosing and feeding of powder materials, in particular to continuous micro dosing or feeding of powder materials. Specifically, embodiments of the present invention relate to a system for a constant and continuous micro dosing and feeding of powder materials. Moreover, embodiments of the invention relate to a method for micro dosing and feeding of powder materials.

TECHNOLOGICAL BACKGROUND

Providing a continuous stream of dosed powder materials for further processing still poses a challenge in the field of micro dosing. Most dosing (or feeding) systems for micro dosing of powder material are based on gravimetrical delivery systems comprising vibrating capillaries. The delivery rates of these systems depend on the properties of the powder material itself, which properties have to be considered before dosing of a specific powder material can be performed. Furthermore, delivery rates may vary over time due to inconsistent powder material, i.e., inconsistent powder properties (e.g. particle size and shape distribution, moisture content, composition in the case of powder blends, etc.). With increasing demand for precise dosing and feeding of powder materials, there is still room for improved micro dosing/feeding solutions.

SUMMARY

There may be a need for providing a constant delivery rate of powder material. This allows for dosing and continuous feeding (permanent delivery) of very small amounts of powder.

In order to achieve the object defined above, a system and a method for a constant micro dosing and feeding of powder material according to the independent claims are provided.

According to a first aspect of the invention a system for a constant and continuous micro dosing and feeding of powder material is provided. The system comprises a control device, a cylinder comprising a first opening and a piston which is movably arranged inside the cylinder and controllable by the control device. The piston is movable in the direction to or away from the first opening along a piston stroke direction. The cylinder is configured for storing the powder material between the piston and the first opening. The piston is configured for pushing the powder material through the first opening by moving along the piston stroke direction. Further, the system comprises a removing device for removing the powder material which is pushed out of the first opening of the cylinder for example by a scraper, a pusher, a broom, an air jet and/or related devices. The control device is configured for controlling the piston (e.g. its velocity) and the removing device in a synchronized manner such that a predetermined amount of powder material pushed through the first opening is removable by the removing device.

According to a further aspect of the invention a method for constant and continuous micro dosing and feeding of powder material is provided. The method comprises controlling a piston by a control device. Further the method comprises moving the piston inside a cylinder comprising a first opening in the direction to or away from the first opening of the cylinder along a piston stroke direction. Further, it comprises storing the powder material in the cylinder between the piston and the first opening and pushing powder material through the first opening by moving the piston along the piston stroke direction. The powder material which is pushed out of the first opening of the cylinder is removed by a removing device (for example a pusher, a scraper, a broom, an air jet and/or a related device). Further, the method comprises controlling the piston and the removing device in a synchronized manner such that a predetermined amount of powder material pushed through the first opening of the cylinder is removable by the removing device.

The powder material is movable out of the cylinder by moving the piston to the open side (the first opening) of the cylinder. The powder material is insertable into the cylinder e.g. by an inserting device which may be an internal part or an external part of the micro dosing/feeding system. The inserting device may also be controllable by the control device. Further, in the inserting device the powder material is stored.

Further, a constant powder material density inside the cylinder may be achieved by using a vibration system, so that exactly the same filling mass and density is achieved in all cases. Alternatively, the material can be pre-densified by suitable methods (e.g., by a pusher or plunger). Further, inner surfaces of the cylinder and/or surfaces of the piston may be formed smooth, e.g. by applying a coating, for minimize the friction coefficient between the powder material and the inner surfaces of the cylinder and the surfaces of the piston. Hence, by having smooth surfaces, a compression of the powder material during operation may be reduced. In order to minimize compression due to the self-weight of the charged powder, powder can be fed via a bigger cylinder (larger inner diameter) and slower piston lifting speeds.

The used powder material may be a pharmaceutical powder material which may be used in dosage forms or packages (e.g. tablets, capsules, etc.). Furthermore, the powder material may be a metallic powder and/or any other powder, including for example food stuff, pigments, catalysts, solid chemicals, natural products, health products, chemical reactants, cosmetic ingredients, biochemical reagents of any other form and/or powdered materials in the range of 100 nm to 2 mm. Further, the powder material may be a granule powder. Powder material of different sizes may be used for dosing. The powder material may be an active pharmaceutical ingredient (API). Further, the powder material may be powder material which may be used for a 3D printer or laser sintering processes.

In the context of the present application the term "micro dosing and feeding" may particularly denote the dosing or feeding of a material, e.g. a powder material, to another apparatus or device. Especially small amounts of the material, e.g. micro amounts, are fed or dosed by the system. The dosing system according to embodiments of the present invention doses a certain amount of powder material in respective dosed powder packages. By the dosing system small powder packages having a very exact desired amount of powder material may be dosed. The dosing speed (feed or delivery rate) of the powder material may be less than 500 g (Gram) per hour.

In the context of the present application the term "constant" may particularly denote that a constant, feeding/dosing flow rate (mass per time) of the powder material and powder packages, respectively can be achieved. In other words, a constant stream of dosed powder packages having a very exact desired amount of powder material is provided.

In the context of the present application the term "control device" may particularly denote an apparatus which controls the system for micro dosing. The control device may be an integral part of the system or it may be an external part. The control device may be formed of a computer or a processor unit, respectively. For controlling the system, the control device may be electronically coupled to (e.g. an actuator of) the piston and the removing device.

In the context of the present application the term "piston stroke direction" may particularly denote a specific moving direction of the piston inside the cylinder. The piston may be arrangeable in such a manner that a stroke direction of the piston comprises at least one component parallel to the gravity. The component defines a vector parallel to the piston stroke direction. In particular, the piston stroke direction is a vertically direction, i.e. an up and down direction, if the dosing system stands on a ground.

In the context of the present application the term "removing device" may particularly denote a device which is adapted for removing the powder material from the first opening of the cylinder and to deliver the removed powder package from the first opening to a desired location, e.g. to a transport unit. The removing device may be formed of powder removing elements, such as below described scraper elements, which are configured to remove the powder material pushed through the first opening out of the cylinder. Alternatively, pushers, brooms, air jets and/or alternative methods may be used.

In the context of the present application the term "synchronized manner" may particularly denote that the control device is configured to synchronize a moving speed of the piston with a removing speed of the removing device. The moving speed of the piston defines the amount of powder material pushed through the first opening and the removing speed defines the dosing sequence, i.e. at which amount of powder material pushed through the first opening is portioned in a respective dosed powder package. Hence, a specific amount of powder material in a powder package is removed by the removing device. In other words, the operation of the removing unit and of the piston is coordinated depending on the amount of powder material which has to be dosed in a powder package. The term synchronized may also denote that the removing unit may remove different amounts of powder materials per powder package.

According to the approach of embodiments of the invention an improved micro dosing system may be provided, by which a constant powder dosing rate with exact defined powder amounts in powder packages may be obtained. A rate of the powder material dosed by the micro dosing system may be influenced by the properties of the powder material. By using a volumetrically delivery system, i.e. a cylinder and piston, a constant and time homogeneous dosing may be provided. The piston inside the cylinder may be controlled in an exact manner. The powder material may be displaced by the piston in a constant manner and may be fed constantly through the first opening. By using a cylinder piston arrangement, a simple system for micro dosing may be provided, which may keep the powder material to be removed at a constant level and with a constant powder density.

In the following, further exemplary embodiments of the micro dosing system and the method will be explained.

According to a further embodiment, the system further comprises a transport unit which is arranged adjacent to the first opening of the cylinder, wherein the removed powder material of a dosed powder package is pushed by the removing device to the transport unit for transporting away the powder material. For example, the powder material may be transported to a blender or mixer for mixing the dosed powder with other APIs or granules. Further, the powder material may be transported to a device, wherein the powder material is dosed into pharmaceutical dosage forms, e.g. tablets or capsules. The transporting unit may be arranged adjacent in such a manner that it is close to the first opening of the cylinder, such that the powder material which is pushed out of the first opening of the cylinder is directly removed by the removing device in a dosed powder package to the transport unit. According to an exemplary embodiment of the invention, the transport unit may comprise a chute element, in particular a vibratable chute element. For example, this chute element may be a pipe having a circular cross-section. Further, the chute element may be a pipe having an open cross section, such that an open pipe is formed. Also, further shapes may be applicable to the transport unit, for example an oval or a rectangular shape. In particular the transport unit may be a filling pipe or of filling channel. In the context of this document the term "vibratable chute element" may particularly denote, that the chute element is vibrating for facilitate the transport of the powder material at the transport unit.

According to an exemplary embodiment of the invention the piston may be movable continuously along the piston stroke direction. In the context of this document the term "continuously" may particularly denote, that the piston is moved stepless and with a constant piston moving speed along the piston stroke direction. By moving the piston continuously along the piston stroke direction also the powder material stored between the piston and the first opening of the cylinder is moved continuously through the first opening of the cylinder, such that a constant powder material movement and/or a constant powder material feeding velocity may be provided. Therefore, a constant dosing rate may be achieved. The dosing rate may be exactly determined, because the amount of powder stored inside the cylinder between the piston and the first opening of the cylinder and a velocity by which the piston is moved to the first opening of the cylinder is known and controllable, respectively.

According to an exemplary embodiment of the invention the removing device is activatable (movable) continuously or sequentially. If the removing device is activated continuously, a constant movement speed of the removing device is given. For example, the removing device comprises a rotating scraper element for removing the powder material, wherein the rotating speed of the scraper element can be maintained constant. In case of a change in the piston speed, the control element can adopt the rotating speed of the scraper element. If the removing device is activated sequentially, an inconstant movement speed of the removing device is given. For example, the removing device comprises a scraper element for removing the powder material, wherein the scraper element is moved at predetermined time points for sequentially removing the powder material from the first opening.

According to an exemplary embodiment of the invention, the system further comprises at least one further cylinder comprising a further first opening. Further, the system comprises at least one further piston which is movably arranged inside the further cylinder and controllable by the control device. The further piston is movable in the direction to or away from the further first opening along a further piston stroke direction. The further cylinder is configured for pushing further powder material through the further first opening by moving along the further piston stroke direction. In other words, the system comprises at least two piston cylinder arrangements wherein each provide different dosed powder packages. The dosed powder package of the powder material and the dosed powder package of the further amount of powder material may have the same amount or may have different amounts of powder material. Hence, it may be possible to integrate at least two cylinders or more into the system wherein an alternating dosing sequence of dosed powder packages may be provided such that a non-stop operation of the dosing system may be enabled. Further, the powder material provided by the at least two cylinders may be the same or may be different from each other. For example, different APIs may be used in the respective cylinders. Furthermore, the piston speeds of the piston and the further piston may be the same or may differ to each other. Hence, the piston configured for pushing the powder material through the first opening of the cylinder is pushing the powder material faster through the first opening of the cylinder then the further piston is pushing the further powder material through the further first opening of the further cylinder, or vice versa. Furthermore, the size (e.g. diameter) of the cylinders may differ to each other. Thus, continuous powder streams of different materials with different concentrations can be obtained.

According to an exemplary embodiment of the invention the removing device is further configured for removing the further powder material which is pushed out of the further first opening. The control device is configured for controlling the further piston and the removing device in a synchronized manner such that a further predetermined amount of powder material pushed through the further first opening is removable by the removing device. The further predetermined amount of powder material pushed through the further first opening may be the same as the predetermined amount of powder material pushed through the first opening of the cylinder or it may be different from the amount of powder material pushed through the first opening of the cylinder. Therefore, the removing device may remove the predetermined amount of powder and/or the further predetermined amount of powder from the respective openings of the respective cylinders. Further, the control unit is synchronizing the further piston which is pushing a further amount of powder out of a further first opening of the further cylinder with the removing device. The removing device is removing the further amount of powder during, i.e. in the same time, the outward pushing of the further powder material. Therefore, a specific further amount of powder material is removed in a further dosed powder package by the removing device and with the synchronization it is guaranteed that the removing device is always removing the predetermined amount of powder in each removing process. Further, the system comprises an at least one further transport unit (e.g. a further chute) arranged at the further first opening of the further cylinder wherein the removed further powder material is pushed by the removing device to the further transport unit for transporting away the further powder material.

According to an exemplary embodiment of the invention the system may comprise a stroke control plate, which is movable along the piston stroke direction. The piston and the further piston are coupled to the stroke control plate such that by moving the stroke control plate, the piston and the further piston are moved along the piston stroke direction. In other words, the piston and the further piston may be moved at the same time during the dosing by moving the piston and the further piston by the stroke control plate. The stroke control plate is movable in a continuous or sequential manner. When moving in a synchronized manner both pistons may be moved at the same time. When moving in a non-synchronized manner the piston and the further piston are moved independently from each other. For example, the stroke control plate may comprise a control cam, so that each time the control cam passes a piston, the respective piston is lifted and hence pushes powder material through the first opening. This means that the piston and the further piston may move the same or the different distance along the piston stroke direction. The removing device may be controlled in such a manner that it removes the predetermined amount of powder material from the first opening during, i.e. in the same time as, the further piston is pushing the further predetermined amount of powder material out of the further first opening of the further cylinder, or vice versa.

According to an exemplary embodiment of the invention the removing device may comprise a plate comprising a first plate opening coupled to the first opening of the cylinder and a second plate opening coupled to the transport unit. Further, the removing device is configured for pushing the predetermined amount of powder material pushed through the first opening of the cylinder along the plate from the first plate opening to the second plate opening. The plate of the removing device may form a bottom of the removing device and extend along a bottom plane wherein the plate may be surrounded by an edge such that the plate and the surrounding edge are forming a reservoir for the pushed out powder materials. Hence, a loosening of the powder material away from the bottom may be prevented. Further, the first plate opening corresponds to the first opening of the cylinder and the second plate opening corresponds e.g. to an opening or to the shape of the transport unit. The coupling of these openings may be achieved by a detachable coupling, i.e. mechanical coupling (screwing the parts together) or by an undetectable coupling (welding etc.). The first plate opening may have the same size as the first opening of the cylinder and the second plate opening may have the same size as the transport unit. Further, the first plate opening may have the same size as the second plate opening. The first plate opening and the second plate opening are arranged with respect to each other in such a way, that the removing device pushes along a pushing direction the powder material from the first plate opening directly to the second plate opening.

According to an exemplary embodiment of the invention the first plate opening may be smaller than the second plate opening. Thereby, it is ensured that a removed dosed powder package of the powder material is falling through the larger second plate opening. The size of the second plate opening may be large enough to receive all of the removed powder material from the first plate opening.

According to an exemplary embodiment of the invention the plate further may comprise a further first plate opening coupled to the further first opening of the further cylinder and a further second plate opening coupled to the transport unit. The removing device is configured for pushing the further predetermined amount of powder material pushed through the further first opening of the cylinder along the plate from the further first plate opening to the further second plate opening. The further first plate opening corresponds to the further first opening of the further cylinder and a further second plate opening corresponds to a (further) opening or a (further) shape of the (further) transport unit. The further first plate opening may have the same size as the further first opening of the further cylinder and the further second plate opening may have the same size as the (further) transport unit. Further, the further first plate opening may have the same size as the further second plate opening.

According to an exemplary embodiment of the invention the further second plate opening is larger than the further first plate opening. Thereby, it is ensured that all of the removed powder material is falling through the greater further second plate opening. The size of the further second plate opening is large enough to receive all of the removed powder material from the further first plate opening.

According to an exemplary embodiment of the invention the transport unit is configured to connect the second plate opening and the further second plate opening to a common further processing location. For example at the second plate opening a chute of the transport device may be attached and at the further second plate opening a further chute of the transport device may be attached. The chute and the further chute may be combined at their ends which are the ends of the chutes opposite to the ends by which the chutes are coupled to the respective second plate opening and further second plate opening. Both chutes may merge at a merging location so that between the merging location and the further processing location one common chute is provided. Furthermore, depending on the amount of used transport units (e.g. the amount of chutes) they may be merged together at one end for forming one single chute through which the powder material may be transported to a common further processing location. It may also be possible that the second plate opening and the further second plate opening are coupled to respective separated chutes.

According to an exemplary embodiment of the invention the removing device comprises a scraper element which is coupled to the plate such that the scraper element is movable along a surface of the plate, such that the scraper element pushes the predetermined amount of powder material pushed through the first opening of the cylinder along the plate from the first plate opening to the second plate opening. The scraper element may be coupled to the removing device or the scraper element may be an integral part of the removing device. The scraper element may have a sharpened blade which is formed in such a way that by moving the scraper element, the blade scrubs along the surface of the plate. The scraper element may be moved in a rotational or translational manner. For example, the scraper element may be moved across the plate in a translatory direction. Alternatively, the scraper element may rotate around a rotating axis. Further, the scraper element may be exchangeable attached.

According to an exemplary embodiment of the invention the removing device further comprises a rotatable impeller rotatable around a rotating axis and to which the scraper element is formed. In particular the impeller is a rotating plate from which the scraper element extents along an e.g. radial direction with respect to the rotating axis. The scraper element may be metaphorically spoken an arm of the impeller. The rotating axis may be parallel to the piston stroke direction.

According to an exemplary embodiment of the invention, the removing device further comprises a further scraper element which is coupled spaced apart from the scraper element to the rotatable impeller, wherein the further scraper element is movable along the surface of the plate such that the further scraper element pushes the predetermined amount of powder material (e.g. the dosed powder package) pushed through the first opening of the cylinder along the plate from the first plate opening to the second plate opening. In other words, the impeller may comprise at least two scraper elements which form two arms of the impeller. It may also be possible that the impeller comprises more than two scraper elements. The scraper element may be coupled spaced apart along a circumference of the impeller. The impeller may be moved rotationally such that each scraper element may remove the predetermined amount of powder and/or the further predetermined amount of powder. Therefore, each scraper element is transporting powder material from the respective first plate and further first plate opening to the respective second plate and further second plate opening.

According to an exemplary embodiment of the invention at least one of the scraper element or the further scraper element comprises a recess for receiving the pushed predetermined amount of powder and for guiding the received predetermined amount of powder along the plate from the first plate opening to the second plate opening. The recess at the scraper element may have around shape or an oval shape, wherein the shape is protruding inside the scraper element for forming the recess. The recess of the scraper element is able to collect the predetermined amount of powder pushed out of the first opening of the cylinder for guiding this predetermined amount of powder to the transport unit. The recess may form a pocket for improving the guidance of the powder material. Further, also the further scraper element may comprise a recess for receiving the pushed predetermined amount of powder and for guiding the received predetermined amount of powder along the plate from the (further) first plate opening to the (further) second plate opening. The size of the recess may depend on the size of the powder material to be removed. For Example, different scraper elements may be provided, wherein each scraper element has a different recess size, wherein the scraper element may be exchangeable so as to be chosen for the respective predetermined amount of powder material which should be removed.

According to an exemplary embodiment of the invention the removing device may comprise an air jet device for generating a directed air jet. The air jet device is configured for directing the air jet along the plate in a direction from the first plate opening to the second plate opening. The removing device may comprise a respective air jet device for each first plate opening for directing the air jet along the plate in a direction from the respective first plate opening to the respective second plate opening. For example, the removing device may comprise at least two first plate openings and at least to the second plate openings and therefore respective two air jet devices. The air jet device may be arranged adjacent to the first plate opening for being able to directly move the predetermined amount of powder pushed out through the first opening of the cylinder by an air jet to the second plate opening such that the predetermined amount of powder is moved to the transport unit. The air jet device may also be controllable by the control device wherein the strength and the direction of the air jet may be controllable.

According to an exemplary embodiment of the invention the piston is configured for being moved along the piston stroke direction such that a feed rate of the powder material through the first opening is in a range between 0.5 g/h to 500 g/h (grams per hour), wherein the feed rate of the powder material may be constant during the dosing of the powder material. The feed rate may be changed by adapting the piston, wherein the piston size is varied. Further, slower feed rates may be achieved with a slower velocity of the piston. The diameter of the piston for adapting the feed rate may be in a range of 2 mm to 20 cm and the length may be in a range of 0.5 cm to 100 cm.

According to an exemplary embodiment of the invention the control device is configured to control at least one of the group comprising of a stroke of the piston, a velocity of the piston, a velocity of the removing device and a direction of the removing device. The stroke of the piston may be the maximum way which the piston may be moved into one direction inside of the cylinder. The velocity of the piston may be the speed of the piston with which it is moved inside of the cylinder. A velocity of the piston may be in a range of 0.05 mm/min to 50 mm/min, in particular in a range of 0.1 mm/min to 20 mm/min. The velocity of the removing device may be the speed of the removing device with which it is moved in a translational and a rotationally manner for removing the (further) predetermined amount of powder. The direction of the removing device may be the translational moving and the rotational moving of the removing device, wherein the translational moving may comprise a moving from one site to another site and the rotational moving may comprise a circular moving. The velocity of the piston may be varied during the dosing of the powder material such that the system may adapt a deviation occurring during the dosing. Constant velocity of the piston may be achieved by a constant drive, e.g. by a spindle screw. Further, also the velocity and a stroke of the further piston may be controllable by the control device. By the piston moved with a constant velocity the predetermined amount of powder may be pushed out of the first opening of the cylinder in a constant manner.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment.

DETAILED DESCRIPTION OF EXEMPLARY EMBODIMENTS

Figure 1:
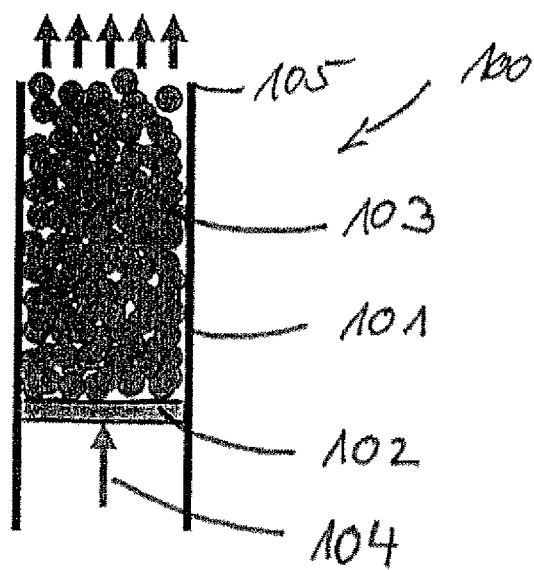
FIG. 1 shows a schematical cylinder piston arrangement according to an exemplary embodiment of the invention.

The illustration in the drawings is schematic. It is noted that in different figures, similar or identical elements are provided with the same reference signs.

Figure 2:
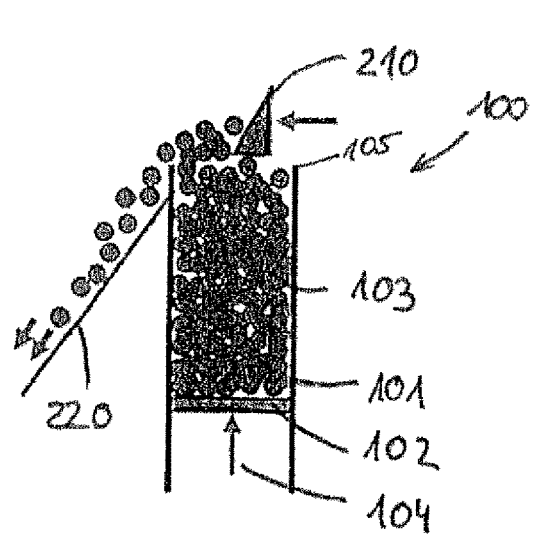
FIG. 2 shows a further schematical cylinder piston arrangement comprising a removing device.
Figure 3:
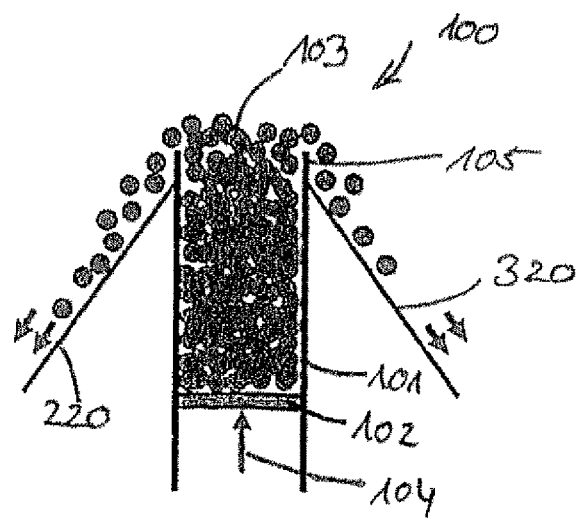
FIG. 3 shows a further schematical cylinder piston arrangement comprising at least one transporting unit.

In the following, referring to FIG. 1 to FIG. 3, a system for micro dosing and feeding according to an exemplary embodiment is illustrated in a schematic manner.

The system comprises a cylinder 101 comprising a first opening 105 and a piston 102 movably arranged inside the cylinder 101 and controllable by the control device 560, wherein the piston 102 is movable in the direction to or away from the first opening 105 along a piston stroke direction 104. The cylinder 101 is configured for storing the powder material 103 between the piston 102 and the first opening 105. The piston 102 is configured for pushing the powder material 103 through the first opening 105 by moving along the piston stroke direction 104. The system further comprises a removing device 210 (see FIG. 2) for removing the powder material 103 which is pushed out of the first opening 105 of the cylinder 101. A control device 560 (see FIG. 5) of the system is configured for controlling the piston 102 and the removing device 210 in a synchronized manner such that a predetermined amount of powder material 103 pushed through the first opening 105 is removable by the removing device 210. As can be taken from FIG. 1 the cylinder 101 and the piston 102 form a cylinder piston arrangement 100. The cylinder 101 is filled with powder material 103. The piston 102 moves along a piston stroke direction 104 inside the cylinder 101. As can be seen in FIG. 1 the piston stroke direction 104 of the piston 102 is the up and down direction, i.e. the vertically direction. According to another exemplary embodiment at least one component may be parallel to the gravity (vertically), such that the cylinder 101 may also be inclined. The piston 102 is movable in the direction or away from the first opening 105 along the piston stroke direction 104. The powder material 103 is pushed through the first opening 105 by moving along the piston stroke direction 104. The piston 102 may be movable continuously along the piston stroke direction 104, such that the powder material 103 is continuously pushed out of the first opening 105 of the cylinder 101.

In the following, referring to FIG. 2, a removing unit 210 is shown for removing the powder material 103 which is pushed out of the first opening 105 of the cylinder 102. In FIG. 2 the removing unit 210 is shown during a removing process, wherein the removing unit 210 is positioned on top of the cylinder 101, in particular above the first opening 105 of the cylinder 101. As can be seen in FIG. 2, the powder material 103 is removed by the removing unit 210. Further, the system comprises a transporting device 220, which is arranged adjacent to the first opening 105 of the cylinder 101. The powder material 103 removed by the removing unit 210 is pushed to the transport unit 220 such that the transport unit 220 can transport the powder material 103 away. The transport unit may be a chute element 220, which is coupled to the first opening 105 of the cylinder 101, such that the removed powder material 103 can be moved directly to the chute element 220. The chute element 220 may be formed inclined that the powder material is sliding by gravity to further processing devices.

In the following, referring to FIG. 3, two removing units 220 and 320 (e.g. chute elements) are shown. Both chute elements are formed inclined, such that the powder material 103 may be moved by gravity to further processing devices. Further, the chute element 220 may be a vibratable chute element, such that the powder material 103 is transported with the support of the vibratable chute element along the chute element 220, 320 to further processing devices.

Figure 4:
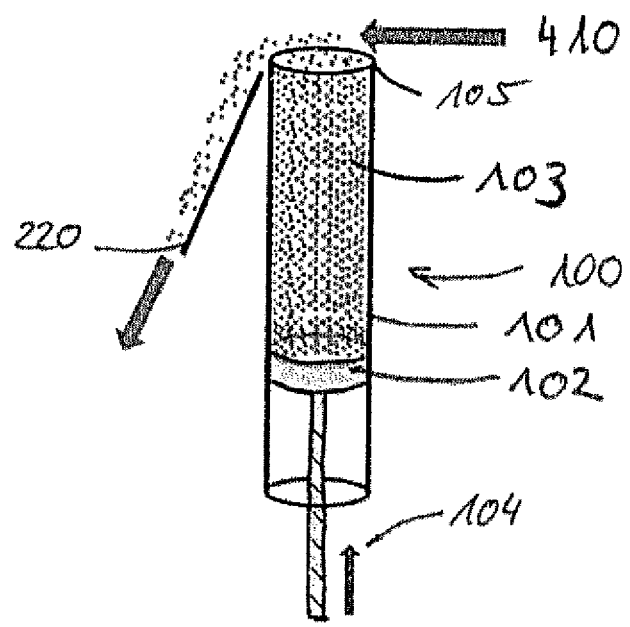
FIG. 4 shows a further schematical cylinder piston arrangement comprising an air jet device.

In the following, referring to FIG. 4 a system for micro dosing and feeding according to an exemplary embodiment will be described.

The system comprises a cylinder 101, a piston 102 and a first opening 105 of the cylinder. Also, a transport unit 220 is coupled to the cylinder 101. Further, the removing unit 210 comprises an air jet device 410 for generating a directed air jet. The air jet device 410 directs the air jet to blow the powder material 103 from the first opening 105 to the transport unit 220. In particular the air jet device 410 is configured for directing the air jet along the first opening 105 in a direction from the first opening 105 to the transport unit 220.

Figure 5:
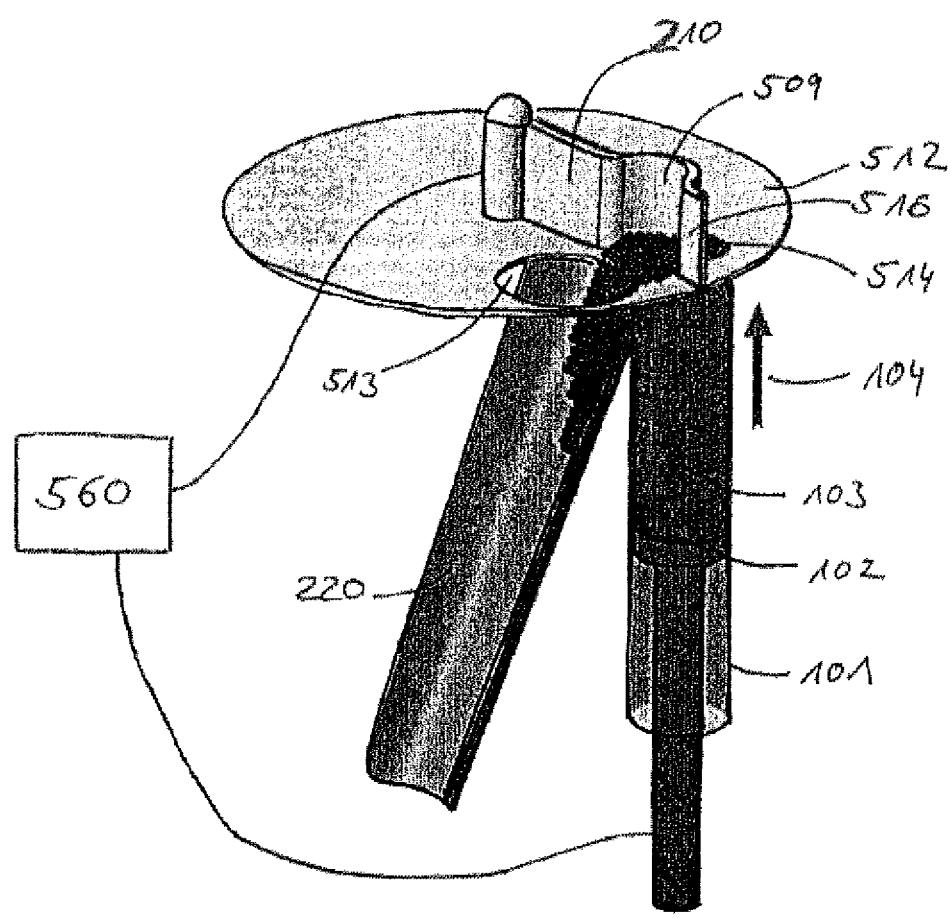
FIG. 5 shows a micro dosing system with a removing device according to an exemplary embodiment of the invention.

In the following, referring to FIG. 5 a system for micro dosing and feeding according to an exemplary embodiment will be described. FIG. 5 shows an embodiment, wherein the principles shown in FIG. 1 to FIG. 3 are realized.

The system for micro dosing and feeding comprises the cylinder 101, the piston 102, and the powder material pushed by the piston 102 to the first opening 105 of the cylinder. Further the system comprises the removing unit 210 coupled to the cylinder 101. The powder material 103 pushed out of the first opening 105 is removed by the removing unit 210 and removed to the transport unit 220. Further, the system comprises a control device 560. The control device 560 may control the piston 102 movably arranged inside the cylinder 101. Further the control device 560 is configured for controlling the piston 102 and the removing unit 210 in a synchronized manner such that a predetermined amount of powder material 103 may be pushed through the first opening 105. The control device 560 is configured to control at least the stroke of the piston 102 and the velocity of the piston 102.

The control device 560 determines the length of the stroke and the velocity of the piston 102 along the piston stroke direction 104. Further, the control device 560 is configured to control at least a velocity of the removing unit 210 and the direction of the removing unit 210. The removing unit 210 may be activated continuously or sequentially. For example, the removing unit 210 in FIG. 5 may rotate continuously along a surface of a plate 512 and is removing the powder material 102 continuously. Alternatively, the plate 512 may be rotated sequentially. As can be seen in FIG. 5 the removing unit 210 comprises the plate 512 which has a first plate opening 514 and a second plate opening 513. The second plate opening 513 is coupled to the transport unit 220 and the first plate opening 514 is coupled to the first opening 105 of the cylinder. The removing unit 210 removes the powder material 103 from the first plate opening 514 to the second plate opening 513 along the surface of the plate 512. As can be seen in FIG. 5 the first and second plate opening 513, 514 have an equal size, but they may also have different sizes. For example, the first plate opening 514 may be smaller than the second plate opening 513. The removing unit 210 comprises a scraper element 516 which is coupled to the plate 512. For example, the scraper element 516 is rotatably coupled to the plate 512, such that the scraper element 516 rotates around a rotational axis. The rotational axis may be arranged in a center of the plate 512 and may be parallel to the piston stroke direction 104. The scraper element 516 scrapes along a surface of the plate 512 for removing the powder material 103 from the first plate opening 514 to the second plate opening 513. The scraper element 516 comprises a recess 509 (e.g. a cavity inside the scraper element 516). The recess 509 may also be formed by bending the scraper element 509 such that the scraper element 509 forms an arch, a curve or a chamber which is able to receive the powder material 103 pushed out of the first opening 105 of the cylinder 101 and guiding the received powder material 103 along the plate 512 from the first plate opening 514 to the second plate opening 513.

Figure 6:
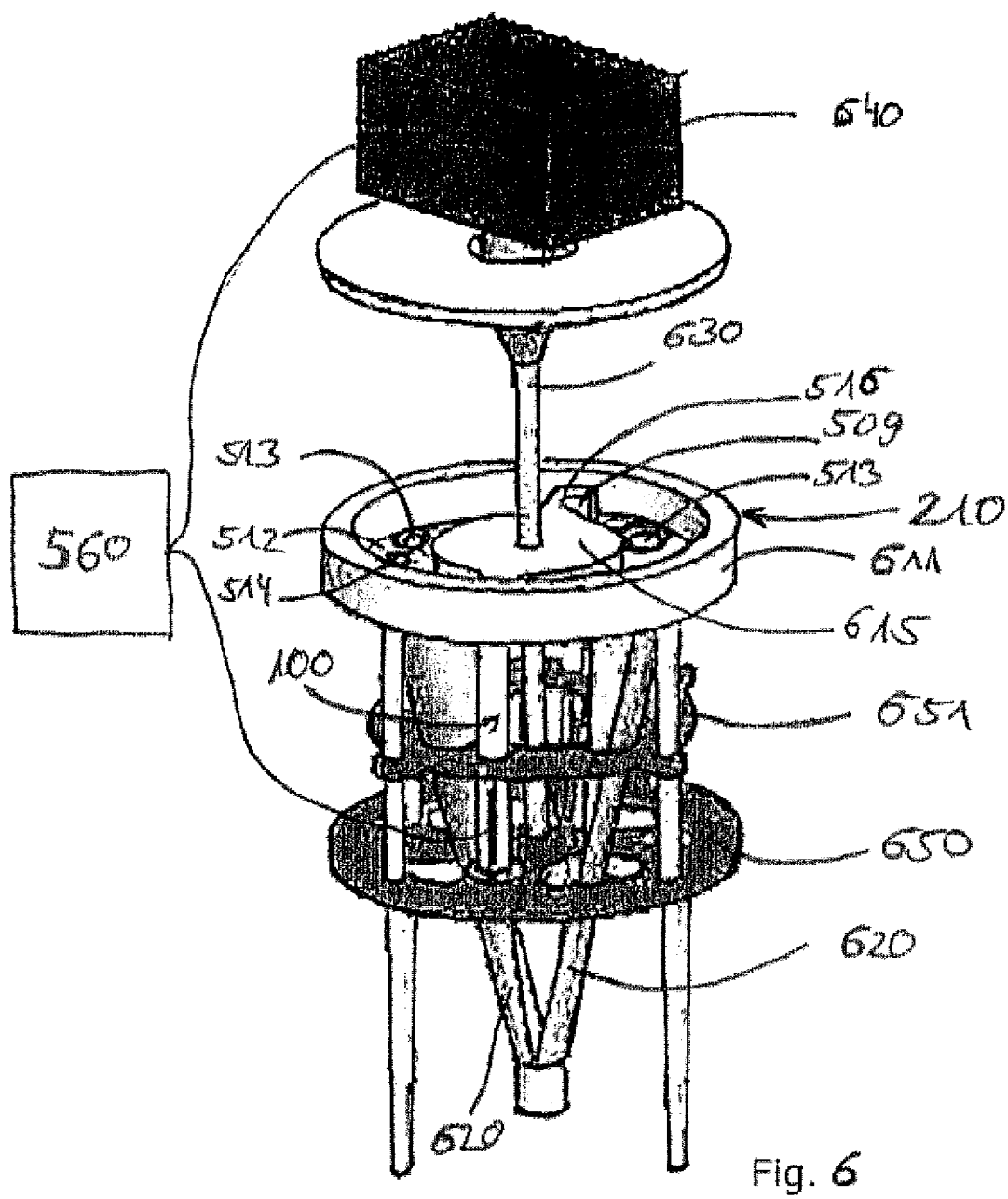
FIG. 6 shows a micro dosing system with a further removing device according to an exemplary embodiment of the invention.

In the following, referring to FIG. 6 a system for micro dosing and feeding according to an exemplary embodiment will be described.

The system for micro dosing and feeding according to this embodiment comprises the cylinder 101 and the piston 102. The system comprises one further cylinder having a further first opening and a further piston which is movably arranged inside the further cylinder. The further cylinder and the further piston are also controllable by the control device 560. The further piston is movable along a further piston stroke direction, wherein this piston stroke direction is the same direction as the piston stroke direction 104 of the piston 102. The further cylinder is configured for pushing further powder material through the further first opening by moving along the further piston stroke direction. The removing device 210 comprises, amongst the plate 512, the scraper element 516, a further first plate opening 514 which is coupled to the further first opening of the cylinder and a further second plate opening 513 which is coupled to the transport unit 620. The removing unit 210 is configured for pushing the further predetermined amount of powder material along the plate 512 from the further first plate opening 514 to the further second plate opening 513. Further, a stroke control plate 650 is provided, which moves along the piston stroke direction 104. The cylinder 101 and the further cylinder are coupled to the stroke control plate 650, such that when moving the stroke control plate 650 the piston 102 and the further piston are moved along the piston stroke direction 104. The further piston and the removing unit 210 are controlled by the control device 560, wherein they are controlled in a synchronized manner. This means, that the removing unit 210 can remove the further predetermined amount of powder material and also the predetermined amount of powder material pushed out by the piston. As can be seen in FIG. 6 the system further comprises a motor 640 which is coupled by a shaft 630 to the removing unit 210, such that the removing unit 210 is driven by the motor 640. The control device 560 controls the motor so as to control the removing unit 210. The shaft 630 is attached to the removing unit 210, namely to the middle axis of the removing unit 210, such that the removing unit 210 is movable in a rotational manner. Further, each second plate opening 513 is coupled to the transport unit 620. As can be seen in FIG. 6 in detail, the transport unit 620 is formed of two chute elements, wherein each chute element is coupled to the second plate opening 513 and the further second plate opening 513. At the end, which is placed spaced apart of the removing unit, the transport unit 620 connects the two chute elements to one chute element (e.g. a pipe). Therefore, the predetermined amount of powder material and the further predetermined amount of powder material are pushed through separate chute elements 620 from the second and further second plate openings 513 to the location where the chute elements merge together. Further, the system comprises a fixing plate 651 which is provided as a basis for holding and fixing the cylinder 101 and the piston 102, wherein also the transport unit can be held and fixed by the fixing plate 651.

Figure 7:
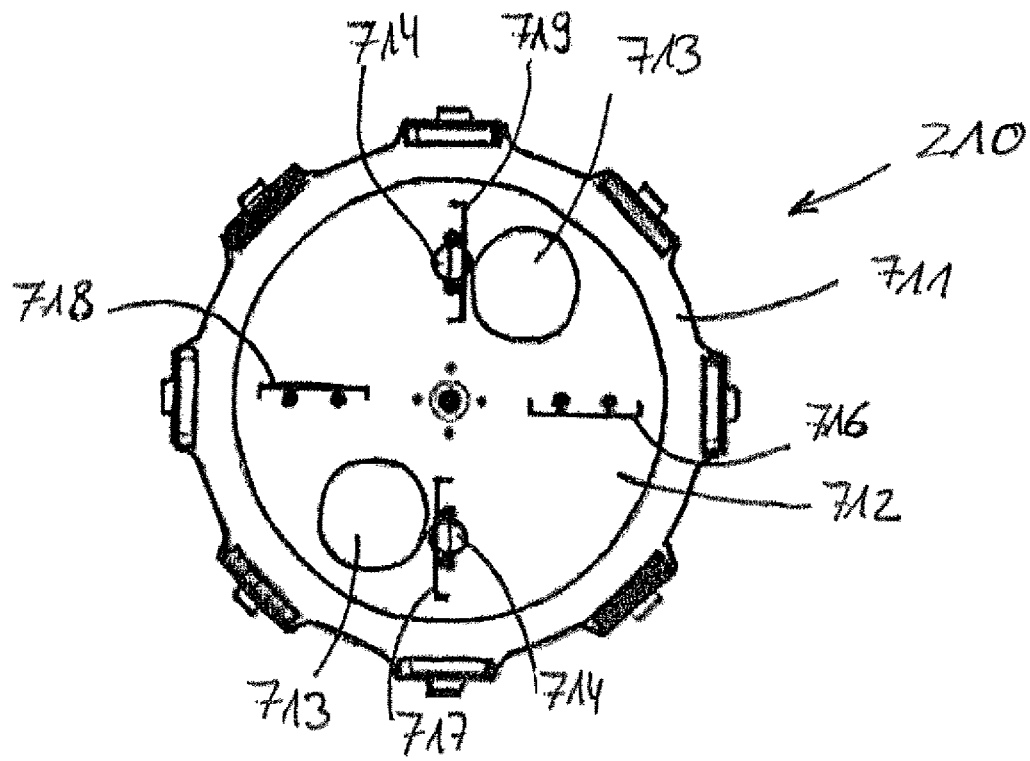
FIG. 7 shows a removing device with a scraper element according to an exemplary embodiment of the invention.

In the following, referring to FIG. 7 a removing device for a system for micro dosing and feeding according to an exemplary embodiment will be described.

The removing device 210 according to this embodiment comprises a plate 712 which is surrounded by an edge 711 such that a reservoir is formed which can hold the powder material pushed out of the first 105 or the further first opening of the cylinder 101 or further cylinder. At the plate 512 two first plate openings 714 are formed and two respective second plate openings 713 are formed 513. The removing device 210 comprises a scraper element 716 and at least one further scraper element 717 which is coupled spaced apart from the scraper element 716. Both scraper elements 716, 717 are movable along the plate 712 such that the further scraper element 717 pushes the predetermined amount of powder material along the plate 712 from the first plate opening 714 to the second plate opening 714. The further scraper element 717 can also push the further predetermined amount of powder material along the plate 712 from the further first plate opening 714 to the further second plate opening 713. Hence, both the scraper element and the further scraper element can push the predetermined and the further predetermined amount of powder material along the plate 712. Furthermore, the removing unit comprises a third and a fourth scraper element 718 and 719 which can push the predetermined and the further predetermined amount of powder material along the plate 712. The four scraper elements 716, 717, 718, 719 are arranged equally spaced apart from each other along a circumferential direction of the plate 712 The scraper elements 716, 717, 718, 719 according to the shown embodiment are rotating scrapers or rotating knives having a sharpened blade. The scraper elements 716, 717, 718, 719 are moving in a rotational manner, such that they are rotating around a central axis of the removing device 210 (the center axis of the plate 712). It is also possible to use more than four or less than four scraper elements 716, 717, 718, 719 for removing a predetermined amount of powder material. Depending on the rotation speed of the scraper elements 716, 717, 718, 719 the amount of powder material which is removed is determined. If the rotation speed is low the piston 102 can push a higher amount of powder material out of the cylinder as if the rotation speed is higher.

Figure 8:
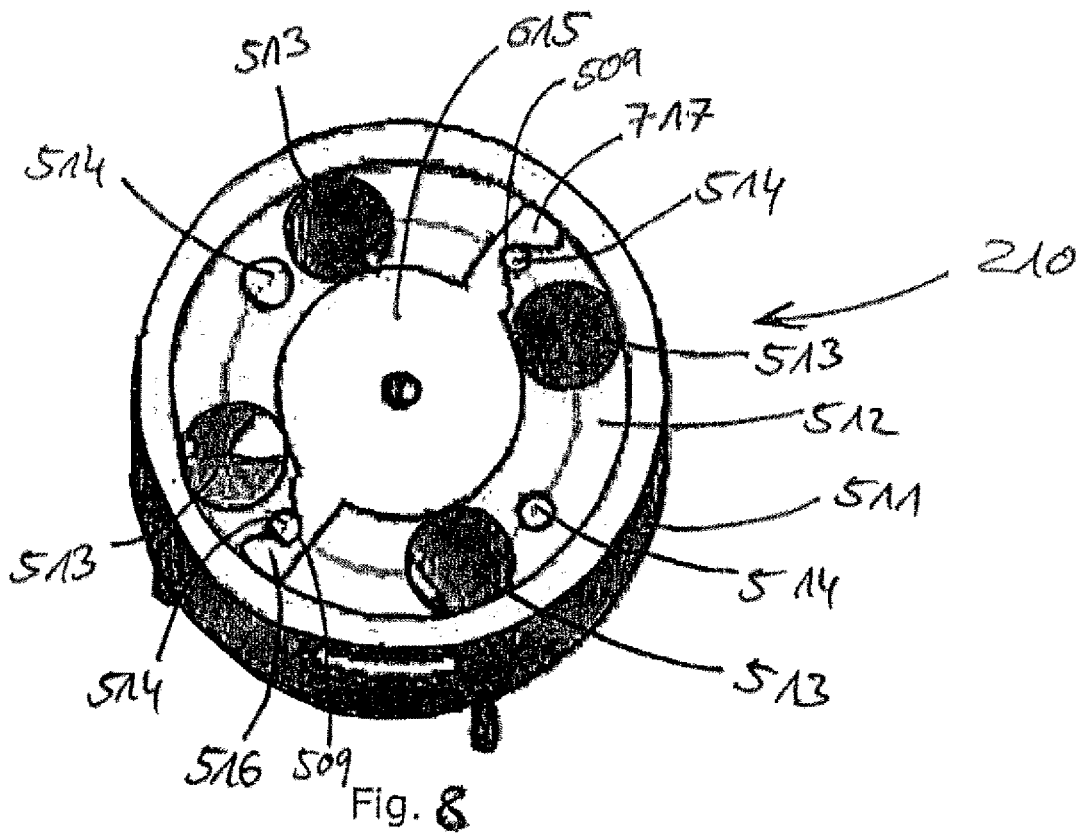
FIG. 8 shows another removing device with another scraper element according to an exemplary embodiment of the invention.

In the following, referring to FIG. 8 a removing device for a system for micro dosing and feeding according to an exemplary embodiment will be described.

This removing device 210 comprises a rotatable impeller 615 to which the scraper element 516 is formed. A further scraper element 717 is also formed to the impeller 615. Therefore, the removing device from FIG. 8 comprises two scraper elements 516, 717. Further, the removing device comprises four first plate openings 514 and four second plate openings 513. These openings are arranged circular along the plate 512, wherein they are arranged equally spaced apart from each other along a circumferential direction of the plate 712. The scraper elements 516, 717 of the impeller 615 are rotatable around a common axis 516, 717. Other orientation of the scraper elements 516, 717 and the first and second plate openings 513, 514 respectively are also possible. The size of the first plate opening and the further first plate opening (and of the third first and fourth first plate opening) is the same. Alternatively, the size of the first plate opening and the further first plate opening (and of the third first and fourth first plate opening) may be different from each other. Different sizes of the first plate openings may be adapted according to the diameter of cylinder.

It should be noted that the term "comprising" does not exclude other elements or steps and the article "a" or "an" does not exclude a plurality. Also, elements described in association with different embodiments may be combined.

LIST OF REFERENCE SIGNS 100 cylinder piston arrangement
101 cylinder
102 piston
103 powder material
104 piston stroke direction
105 first opening
210 removing device
220 transport unit, chute
320 further transport unit
410 air jet
509 recess
512 plate
513 second plate opening
514 first plate opening
516 scraper element
560 control device
611 edge of the removing device
615 impeller
620 transport unit
630 shaft
640 motor
650 stroke control plate
651 fixing plate
711 edge of the removing device
712 plate
713 second plate opening
714 first plate opening
716 scraper element
717 further scraper element

The invention claimed is:
1. A system for a constant micro dosing of powder material, comprising:
a control device,
a cylinder comprising a first opening,
a piston movably arranged inside the cylinder and controllable by the control device,
wherein the piston is movable in the direction to or away from the first opening along a piston stroke direction,
wherein the cylinder is configured for storing the powder material between the piston and the first opening,
wherein the piston is configured for pushing the powder material through the first opening by moving along the piston stroke direction,
a removing device for removing the powder material which is pushed out of the first opening of the cylinder,
wherein the control device is configured for controlling the piston and the removing device in a synchronized manner such that a predetermined amount of powder material pushed through the first opening is removable by the removing device, wherein the removing device comprises a plate comprising a first plate opening coupled to the first opening of the cylinder and a second plate opening coupled to the transport unit,
wherein the removing device is configured for pushing the predetermined amount of powder material pushed through the first opening of the cylinder along the plate from the first plate opening to the second plate opening,
wherein the first plate opening is smaller than the second plate opening.

2. The system according to claim 1, further comprising:
a transport unit arranged adjacent to the first opening of the cylinder,
wherein the removed powder material is pushed by the removing device to the transport unit for transporting away the powder material.

3. The system according to claim 2,
wherein the transport unit comprises a chute element.

4. The system according to claim 1,
wherein the piston is movable continuously along the piston stroke direction.

5. The system according to claim 1,
wherein the removing device is activatable continuously or sequentially.

6. The system according to claim 1, further comprising:
at least one further cylinder comprising a further first opening,
at least one further piston movably arranged inside the further cylinder and controllable by the control device,
wherein the further piston is movable in the direction to or away from the further first opening along a further piston stroke direction,
wherein the further cylinder is configured for pushing further powder material through the further first opening by moving along the further piston stroke direction.

7. The system according to claim 6,
wherein the removing device is further configured for removing the further powder material which is pushed out of the further first opening,
wherein the control device is configured for controlling the further piston and the removing device in a synchronized manner such that a further predetermined amount of powder material pushed through the further first opening is removable by the removing device.

8. The system according to claim 6, further comprising:
a stroke control plate, which is movable along the piston stroke direction,
wherein the piston and the further piston are coupled to the stroke control plate such that by moving the stroke control plate, the piston and the further piston are moved along the piston stroke direction.

9. The system according to claim 1, further comprising:
at least one further cylinder comprising a further first opening,
at least one further piston movably arranged inside the further cylinder and controllable by the control device,
wherein the further piston is movable in the direction to or away from the further first opening along a further piston stroke direction,
wherein the further cylinder is configured for pushing further powder material through the further first opening by moving along the further piston stroke direction,
wherein the plate further comprises a further first plate opening coupled to the further first opening of the further cylinder and a further second plate opening coupled to the transport unit,
wherein the removing device is configured for pushing the further predetermined amount of powder material pushed through the further first opening of the cylinder along the plate from the further first plate opening to the further second plate opening.

10. The system according to claim 9,
wherein the transport unit is configured to connect the second plate opening and the further second plate opening to a common further processing location.

11. The system according to claim 1,
wherein the removing device comprises a scraper element which is coupled to the plate such that the scraper element is movable along a surface of the plate such that the scraper element pushes the predetermined amount of powder material pushed through the first opening of the cylinder along the plate from the first plate opening to the second plate opening.

12. The system according to claim 11,
wherein the removing device further comprises a rotatable impeller to which the scraper element is formed.

13. The system according to claim 12,
wherein the removing device further comprises a further scraper element which is coupled spaced apart from the scraper element to the rotatable impeller,
wherein the further scraper element is movable along the surface of the plate such that the further scraper element pushes the predetermined amount of powder material pushed through the first opening of the cylinder along the plate from the first plate opening to the second plate opening.

14. The system according to claim 13,
wherein at least one of the scraper element or the further scraper element comprises a recess for receiving the pushed predetermined amount of powder and for guiding the received predetermined amount of powder along the plate from the first plate opening to the second plate opening.

15. The system according to any claim 1,
wherein the removing device comprises an air jet device for generating a directed air jet,
wherein the air jet device is configured for directing the air jet along the plate in a direction from the first plate opening to the second plate opening.

16. The system according to claim 1,
wherein the piston is configured for being moved along the piston stroke direction such that a feed rate of the powder material through the first opening is in a range between 1 g/h to 50 g/h.

17. The system according to claim 1,
wherein the control device is configured to control at least one of the group comprising of a stroke of the piston, a velocity of the piston, a velocity of the removing device and a direction of the removing device.

18. A method for constant micro dosing of powder material, the method comprising:
controlling a piston by a control device,
moving the piston inside a cylinder comprising a first opening in the direction to or away from the first opening of the cylinder along a piston stroke direction,
storing the powder material in the cylinder between the piston and the first opening, pushing powder material through the first opening by moving the piston along the piston stroke direction,
removing the powder material which is pushed out of the first opening of the cylinder by a removing device, and
controlling the piston and the removing device in a synchronized manner such that a predetermined amount of powder material pushed through the first opening of the cylinder is removable by the removing device, wherein the removing device comprises a plate comprising a first plate opening coupled to the first opening of the cylinder and a second plate opening coupled to the transport unit, wherein the removing device is configured for pushing the predetermined amount of powder material pushed through the first opening of the cylinder along the plate from the first plate opening to the second plate opening, wherein the first plate opening is smaller than the second plate opening.

* * * * *